US008760141B2

(12) United States Patent
Man et al.

(10) Patent No.: US 8,760,141 B2
(45) Date of Patent: Jun. 24, 2014

(54) FREQUENCY-HOPPING PULSE-WIDTH MODULATOR FOR SWITCHING REGULATORS

(75) Inventors: Tsz Yin Man, Shatin (HK); Kwok Tai Philip Mok, Clear Water Bay (HK); Man Sun John Chan, Clear Water Bay (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 572 days.

(21) Appl. No.: 12/346,069

(22) Filed: Dec. 30, 2008

(65) Prior Publication Data

US 2009/0174440 A1 Jul. 9, 2009

Related U.S. Application Data

(60) Provisional application No. 61/006,308, filed on Jan. 4, 2008.

(51) Int. Cl.
*G05F 1/40* (2006.01)

(52) U.S. Cl.
USPC .......................................... 323/285; 323/284

(58) Field of Classification Search
CPC .................................. G05F 1/565; G05F 1/575
USPC .......... 323/222, 223, 224, 282, 283, 284, 285, 323/351
See application file for complete search history.

(56) References Cited

U.S. PATENT DOCUMENTS

| 4,633,382 | A * | 12/1986 | Upadhyay et al. ............ 363/132 |
| 6,215,288 | B1 * | 4/2001 | Ramsey et al. ................ 323/224 |
| RE37,609 | E | 3/2002 | Bittner |
| 6,366,070 | B1 * | 4/2002 | Cooke et al. .................. 323/284 |
| 6,713,995 | B2 * | 3/2004 | Chen .............................. 323/284 |
| 6,768,280 | B2 * | 7/2004 | Kitajima ........................ 318/432 |
| 6,788,038 | B1 | 9/2004 | Bell et al. |
| 6,801,024 | B2 | 10/2004 | Bernardon |
| 6,992,470 | B1 | 1/2006 | Chiu |

(Continued)

OTHER PUBLICATIONS

Abu Qahouq et al., "On Load Adaptive Control of Voltage Regulators for Power Managed Loads: Control Schemes to Improve Converter Efficiency and Performance," *IEEE Transactions on Power Electronics*, 22(5): 1806-1819 (Sep. 2007).

(Continued)

*Primary Examiner* — Matthew Nguyen
(74) *Attorney, Agent, or Firm* — Leydig, Voit & Mayer, Ltd.

(57) ABSTRACT

A frequency-hopping pulse-width modulator is disclosed, which facilitates a switching regulator to use smaller-size inductive and capacitive elements, to have an improved power efficiency at light load, as well as predictable spectrum at different load levels. The improved modulator automatically determines the switching frequency of a switching regulator according to the load current delivered by the switching regulator from a number of pre-defined frequencies, which are all multiples of a fundamental frequency. By designing the maximum switching frequency of frequency-hopping pulse-width modulator in the MHz range, a switching regulator is able to use smaller-size inductive and capacitive elements. Light-load efficiency of the switching regulator with the frequency-hopping pulse-width modulator is also greatly improved as switching frequency of such switching regulator is reduced with decreased load current. More importantly, spectrum of a switching regulator with the frequency-hopping pulse-width modulator is as predictable as spectrum of a switching regulator with a conventional pulse-width modulator operated at the fundamental frequency.

11 Claims, 6 Drawing Sheets

(56) References Cited

U.S. PATENT DOCUMENTS

| | | | |
|---|---|---|---|
| 7,046,528 B2 * | 5/2006 | Sankman et al. | 363/41 |
| 7,064,531 B1 | 6/2006 | Zinn | |
| 7,075,346 B1 | 7/2006 | Hariman et al. | |
| 7,075,803 B2 * | 7/2006 | Eberlein | 363/41 |
| 7,116,089 B1 | 10/2006 | Nguyen et al. | |
| 7,176,669 B2 | 2/2007 | Ueda | |
| 7,221,130 B2 | 5/2007 | Ribeiro et al. | |
| 7,269,217 B2 | 9/2007 | Leith et al. | |
| 7,279,869 B2 | 10/2007 | Tzeng et al. | |
| 7,368,897 B2 * | 5/2008 | Qahouq et al. | 323/282 |
| 7,388,360 B2 * | 6/2008 | Baurle et al. | 323/284 |
| 7,466,110 B2 * | 12/2008 | Tsuruya | 323/207 |
| 7,619,395 B2 * | 11/2009 | Mok et al. | 323/224 |
| 7,719,251 B2 * | 5/2010 | Qahouq et al. | 323/286 |
| 8,483,630 B2 * | 7/2013 | Cathelin et al. | 455/108 |
| 2009/0086518 A1 * | 4/2009 | Currie | 363/125 |

OTHER PUBLICATIONS

Lin, "High Power Factor AC/DC/AC Converter with Random PWM," *IEEE Transactions on Aerospace and Electronic Systems*, 35(3): 935-944 (Jul. 1999).

Wong et al., "Electromagnetic Interference of Switching Mode Power Regulator with Chaotic Frequency Modulation," *Proc. 23$^{rd}$ International Conference on Microelectronics (MIEL 2002)*, 2: 577-580 (May 12-15 2002).

Alimadadi et al., "A 3GHz switching DC-DC converter using clock-tree charge-recycling in 90nm CMOS with integrated output filter," 2007 IEEE International Solid-State Circuits Conference, Session 29.8, 532-533, 620, and 29.8.1-29.8.7 (2007).

Hazucha et al., "A 233-MHz 80%-87% efficient four-phase DC-DC converter utilizing air-core inductors on package," IEEE Journal of Solid-State Circuits, 40 (4): 838-845 (Apr. 2005).

Man et al., "A CMOS-control rectifier for discontinuous-conduction mode switching DC-DC converters," 2006 IEEE International Solid-State Circuits Conference, Session 19.8 (2006).

Man et al., "A frequency-hopped pulse-width modulator for buck converters with light-load efficiency improvement," submitted to 2008 IEEE International Solid-State Circuits Conference on Sep. 17, 2007.

Mulligan et al., "A 3MHz low-voltage buck converter with improved light load efficiency," 2007 IEEE International Solid-State Circuits Conference, Session 29.6, 528-529 and 620 (2007).

Musunuri et al., "Improvement of light-load efficiency using width-switching scheme for CMOS transistors," IEEE Power Electronics Letters, 3 (3): 105-110 (Sep. 2005).

\* cited by examiner

FREQUENCY-HOPPING PULSE-WIDTH MODULATOR FOR SWITCHING REGULATORS

CROSS-REFERENCE TO RELATED APPLICATIONS

This patent application claims the benefit of U.S. Provisional Patent Application No. 61/006,308, filed Jan. 4, 2008, which is incorporated herein by reference in its entirety.

FIELD OF THE INVENTION

The invention relates to a modulator controlling a switching regulator, and in particular, to a modulator allowing the use of a switching regulator with smaller-size inductive and capacitive elements, improved power efficiency at light load, and predictable spectrum at different levels of load.

BACKGROUND OF THE INVENTION

Pulse-width modulation (PWM) is commonly used to control a switching regulator in which a modulator generates a pulse-width-modulated control signal ($S_{PWM}$) at a fixed frequency ($f_{PWM}$)). An advantage of using PWM is to enable a switching regulator to provide an output voltage ($V_{OUT}$) in which all its spectral components are located at multiples of $f_{PWM}$. As illustrated in FIG. 1, spectral components of $V_{OUT}$ are all located at multiples of $f_{PWM}$, such as from $f_{PWM}$ to $\alpha f_{PWM}$, where $\alpha$ is a positive integer, regardless of value of the load current ($I_{LOAD}$) delivered by a switching regulator. Predictable spectrum at different levels of $I_{LOAD}$ is thus achieved by PWM, which is very important to switching regulators used to power spectrum-sensitive circuits, such as communication circuits. However, the use of MHz-range $f_{PWM}$ in conventional PWM modulators to enable the use of small inductive and capacitive elements in the switching regulator inevitably degrades its light-load efficiency. This is because switching loss of a switching regulator is proportional to $f_{PWM}$, but not to $I_{LOAD}$ delivered by the switching regulator. As $I_{LOAD}$ is reduced, switching loss dominates and becomes much larger than power used by the load connected to the switching regulator. As shown in FIG. 2A, power efficiency of a switching regulator with PWM at MHz-range $f_{PWM}$ is significantly decreased as $I_{LOAD}$ is reduced.

Pulse-frequency modulation (PFM) is known as an effective method to improve light-load efficiency of a switching regulator. A PFM modulator generates a control signal ($S_{PFM}$) in which frequency of $S_{PFM}$ ($f_{PFM}$) is monotonically reduced with decreased $I_{LOAD}$. One of the possible relationships between $f_{PFM}$ and $I_{LOAD}$ is shown in FIG. 2B. Switching loss of a switching regulator with PFM can be reduced with decreased $I_{LOAD}$ such that, as shown in FIG. 2A, light-load efficiency of a switching regulator with PFM is much higher than that with PWM. However, PFM makes a switching regulator with a $V_{OUT}$ in which all its spectral components depend on the value of $I_{LOAD}$. Spectrum of switching regulator with PFM becomes unpredictable at different levels of $I_{LOAD}$ such that a switching regulator with PFM is not favorable to power spectrum-sensitive circuits, such as communication circuits.

As a result, there is a need for a modulator which is able to simultaneously facilitate a switching regulator to have smaller-size inductive and capacitive elements, improved power efficiency at light load, and predictable spectrum at different levels of load.

BRIEF SUMMARY OF THE INVENTION

Embodiments of the invention are used to provide a modulator that allows a switching regulator to use smaller-size inductive and capacitive elements and to have improved power efficiency at light load, as well as predictable spectrum at different levels of load. In embodiments, the modulator controls a switching regulator by generating pulse-width-modulated signal ($S_{FHPWM}$). Frequency of $S_{FHPWM}$ ($f_{FHPWM}$) is automatically chosen from a number of pre-defined frequencies. Within a tolerance, the pre-defined frequency choices for $f_{FHPWM}$ are all integer multiples of a fundamental frequency of the modulator ($f_{FD}$), according to the value of the load current ($I_{LOAD}$) delivered by a switching regulator.

For example, $f_{FHPWM}$ can be any one of the N numbers of pre-defined frequencies that are all multiples of $f_{FD}$ (e.g., $f_{FHPWM}(i)=i*f_{FD}$, where i is any integer number inclusively between 1 to N, and N is a positive integer larger than one). All possible frequencies of $S_{FHPWM}$, $f_{FHPWM}(i)$, are correspondingly mapped to different ranges of $I_{LOAD}$. For example, the largest $f_{FHPWM}(i)$ (e.g., $f_{FHPWM}(N)$) is mapped to the heaviest one among different ranges of $I_{LOAD}$, such as a range with the largest $I_{LOAD}$. The smallest $f_{FHPWM}(i)$ (e.g., $f_{FHPWM}(1)$) is mapped to the lightest one among different ranges of $I_{LOAD}$, such as a range with the smallest $I_{LOAD}$. By designing the largest $f_{FHPWM}(i)$ (e.g., $f_{FHPWM}(N)$) in a MHz frequency range, embodiments of the modulator of the present invention enable a switching regulator to use smaller-size inductive and capacitive elements. By designing the smallest $f_{FHPWM}(i)$ (e.g., $f_{FHPWM}(1)$) in hundreds or even tens of KHz frequency range, embodiments of the modulator in accordance with the present invention significantly reduce the switching loss of a switching regulator, such that its light-load efficiency is greatly improved.

Notably, all possible frequencies of $S_{FHPWM}$, $f_{FHPWM}(i)$, are multiples of a frequency $f_{FD}$, such that all spectral components of an output voltage of a switching regulator in accordance with embodiments of the present invention are located at multiples of $f_{FD}$ regardless of the value of $I_{LOAD}$. As a result, the spectrum of a switching regulator in accordance with embodiments of the present invention is as predictable as a switching regulator with conventional PWM operated at a fixed frequency that has the same value as $f_{FD}$. This unique feature facilitates a switching regulator to power spectrum-sensitive circuits, such as communication circuits.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Embodiments of the invention provide a modulator that facilitates a switching regulator to use smaller-size inductive and capacitive elements and to have an improved power efficiency at light load, as well as predictable spectrum at different load levels.

The improved modulator generates a pulse-width-modulated signal, $S_{FHPWM}$, to control a switching regulator. Frequency of $S_{FHPWM}$, $f_{FHPWM}$, is automatically chosen from N numbers of pre-defined frequencies. Within a tolerance, the pre-defined frequency choices for $f_{FHPWM}$ are all integer multiples of a fundamental frequency of the modulator, $f_{FD}$, according to the value of the load current, $I_{LOAD}$, delivered by the switching regulator (e.g., $f_{FHPWM}(i)=i*f_{FD}$, where i is any integer number inclusively between 1 to N, and N is a positive integer larger than one). All possible frequencies of $S_{FHPWM}$, $f_{FHPWM}(i)$, are correspondingly mapped to different ranges of $I_{LOAD}$ (e.g., $\Delta_{IL}(i)$, where i is any integer number inclusively between 1 to N, and N is a positive integer larger than one). In one embodiment, the tolerance for the pre-defined frequency choices for $f_{FHPWM}$ is five percent (5%), however those skilled in the art will appreciate that other tolerance values are also possible without departing from the scope and spirit of the embodiments of the invention discussed herein.

Figure 1:
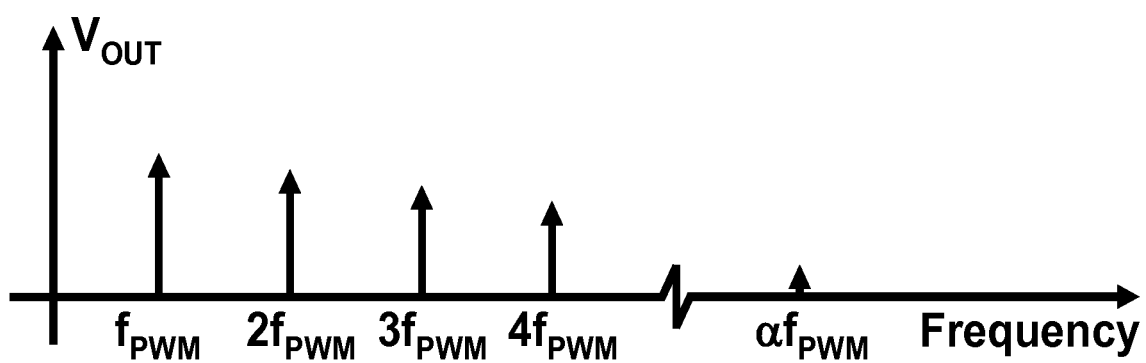
FIG. 1 is a diagram illustrating locations of spectral components of an output voltage of a switching regulator having a modulator that employs conventional PWM at frequency $f_{PWM}$.
Figure 2A:
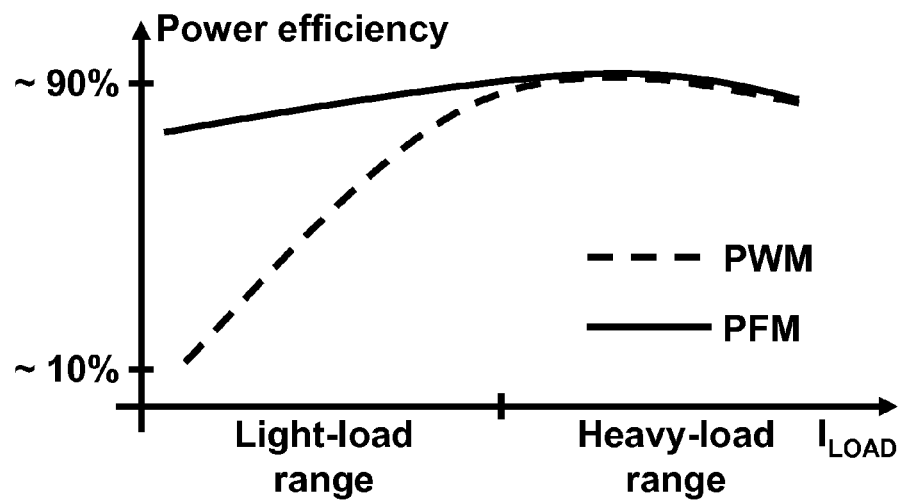
FIGS. 2A and 2B are diagrams illustrating, respectively, plots of power efficiency and frequency of control signal as a function of load current delivered by a switching regulator that is controlled by a modulator with either conventional PWM or conventional PFM.
Figure 2B:
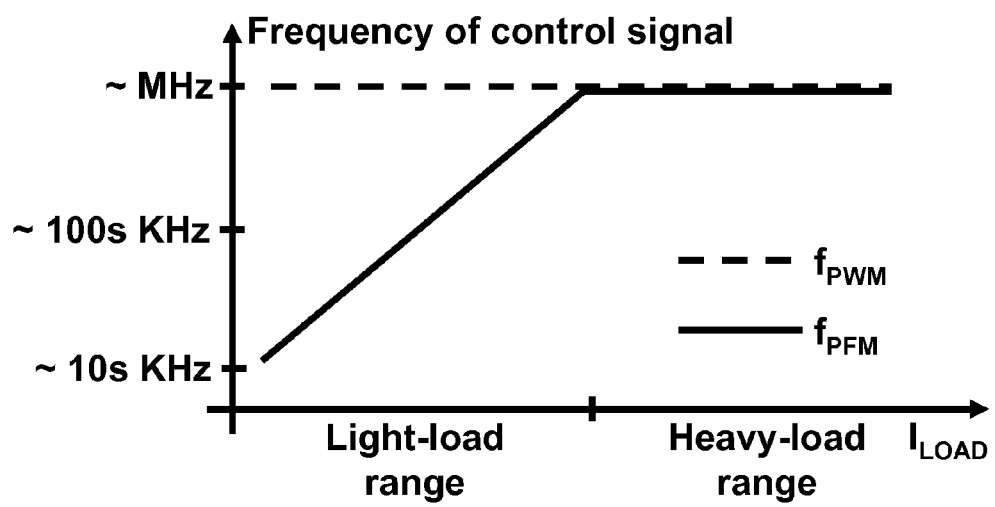
Figure 3A:
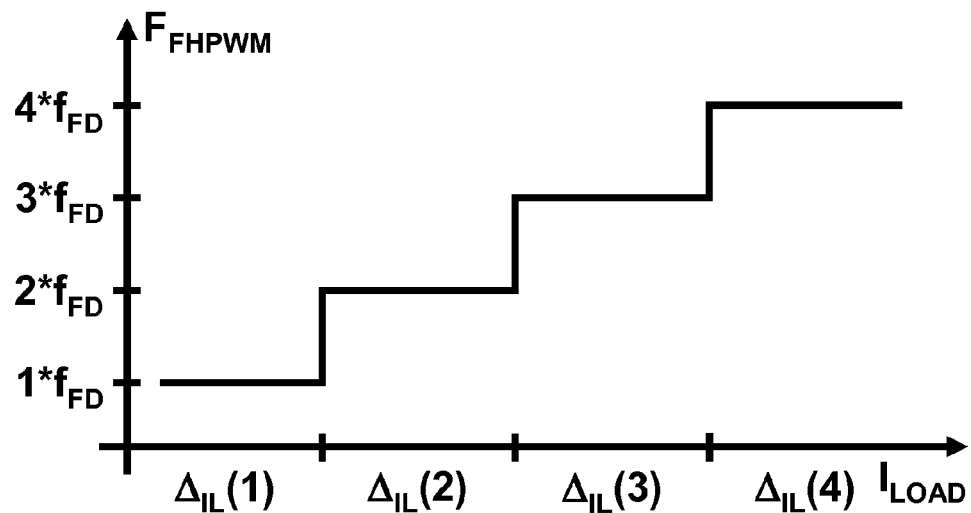
FIGS. 3A and 3B are diagrams illustrating, respectively, plots of frequency of control signal and power efficiency as a function of load current delivered by a switching regulator that uses a modulator in accordance with an embodiment of the invention.
Figure 3B:
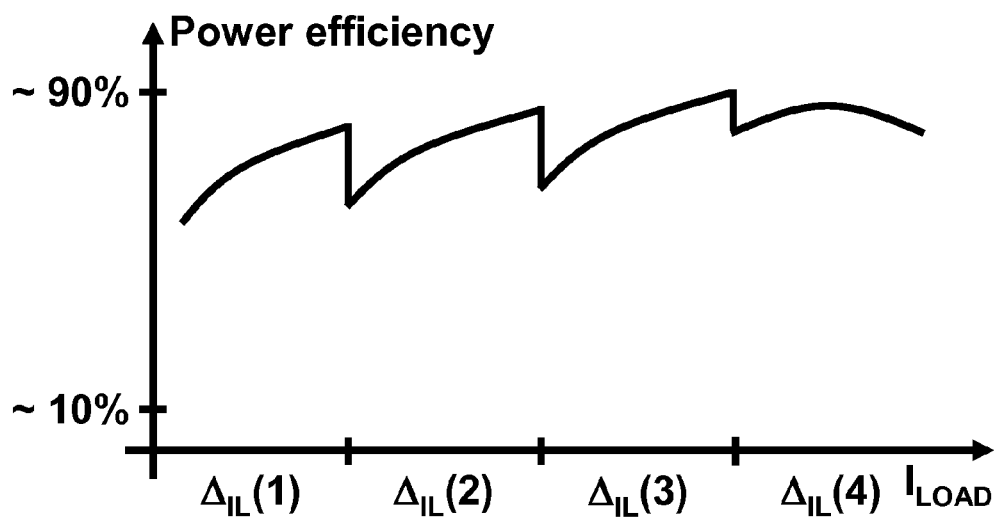

FIGS. 3A and 3B illustrate plots of $f_{FHPWM}$ (FIG. 3A) and power efficiency (FIG. 3B) as a function of $I_{LOAD}$ delivered by a switching regulator with a modulator in which the value of N is chosen to be four (e.g. N=4). As shown in FIG. 3A, the largest value of $f_{FHPWM}(i)$ (e.g., $f_{FHPWM}(4)=4*f_{FD}$) is mapped to the heaviest of different ranges of $I_{LOAD}$, such as $\Delta_{IL}(4)$. The smallest value of $f_{FHPWM}(i)$ (e.g., $f_{FHPWM}(1)=1*f_{FD}$) is mapped to the lightest of different ranges of $I_{LOAD}$, such as $\Delta_{IL}(1)$. In a general, $f_{FHPWM}(i)$ is correspondingly mapped to $\Delta_{IL}(i)$. By designing the $f_{FD}$ in several hundreds of KHz frequency range, for example in one embodiment $f_{FD}$ is designed to be 250 kHz, the maximum of $f_{FHPWM}(i)$ (e.g., $f_{FHPWM}(4)=4*250$ kHz=2 MHz) is at a MHz frequency range, thereby reducing the size of inductive and capacitive elements needed for the switching regulator. At the same time, the smallest $f_{FHPWM}(i)$ (e.g., $f_{FHPWM}(1)=1*250$ kHz=250 KHz) falls within a hundreds of KHz frequency range, thereby providing a reduction in switching loss of the switching regulator with reduced $I_{LOAD}$.

As illustrated in FIG. 3B, the value of light-load efficiency of a switching regulator coupled to an embodiment of the improved modulator is similar to or slightly smaller than the value of heavy-load efficiency due to the fact that switching loss is now reduced with decreased $I_{LOAD}$. An important feature of the improved modulator is that all possible frequencies of $S_{FHPWM}$, $f_{FHPWM}(i)$, are multiples of the fundamental frequency $f_{FD}$.

Figure 4:
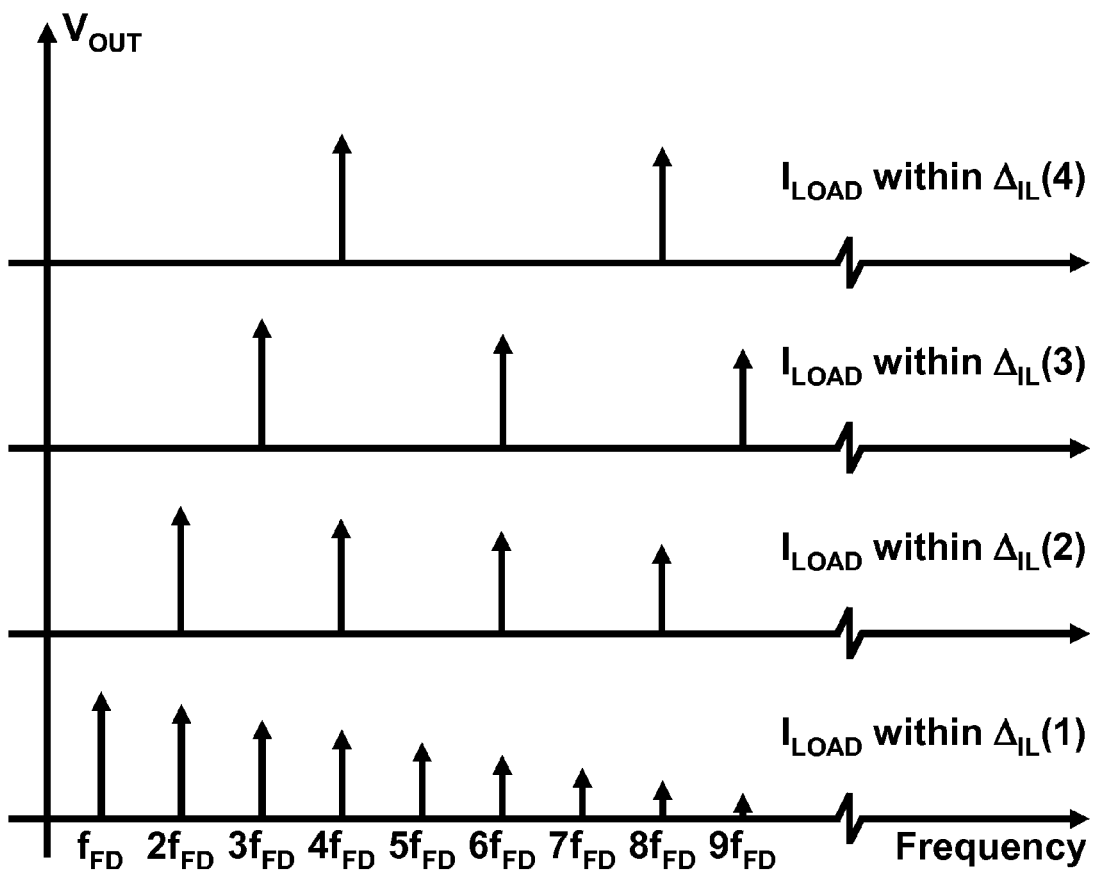
FIG. 4 is a diagram illustrating locations of spectral components of an output voltage of a switching regulator with a modulator in accordance with an embodiment of the present invention under different values of load current.

As shown in FIG. 4, all spectral components of output voltage, $V_{OUT}$, of a switching regulator with an embodiment of the improved modulator are located at multiples of $f_{FD}$ regardless of the value of $I_{LOAD}$. As a result, the spectrum of a switching regulator with a modulator developed in accordance with an embodiment of the present invention is as predictable as a switching regulator with a conventional PWM operated at a fixed frequency that has the same value as $f_{FD}$. This unique feature allows a switching regulator coupled to the improved modulator to power spectrum-sensitive circuits, such as communication circuits.

When a switching regulator with an embodiment of the improved modulator operates at steady-state and provides an $I_{LOAD}$ that is within $\Delta_{IL}(i)$, frequency of $S_{FHPWM}$ is maintained at $f_{FHPWM}(i)$. Once the $I_{LOAD}$ of the switching regulator is increased from the range of $\Delta_{IL}(i)$ to the range of $\Delta_{IL}(i+1)$, the improved modulator correspondingly increases frequency of $S_{FHPWM}$ from $f_{FHPWM}(i)$ to $f_{FHPWM}(i+1)$, where all possible values of i are integers inclusively from 1 to N−1. When the $I_{LOAD}$ of a switching regulator is increased but falls within the range of $\Delta_{IL}(N)$, frequency of $S_{FHPWM}$ is maintained to be $f_{FHPWM}(N)$. When the $I_{LOAD}$ of a switching regulator is decreased from the range of $\Delta_{IL}(i)$ to the range of $\Delta_{IL}(i-1)$, the improved modulator correspondingly decreases frequency of $S_{FHPWM}$ from $f_{FHPWM}(i)$ to $f_{FHPWM}(i-1)$, where all possible values of i are integers inclusively from 2 to N. When the $I_{LOAD}$ of a switching regulator is decreased but falls within the range of $\Delta_{IL}(1)$, frequency of $S_{FHPWM}$ is maintained to be $f_{FHPWM}(1)$.

Figure 5:
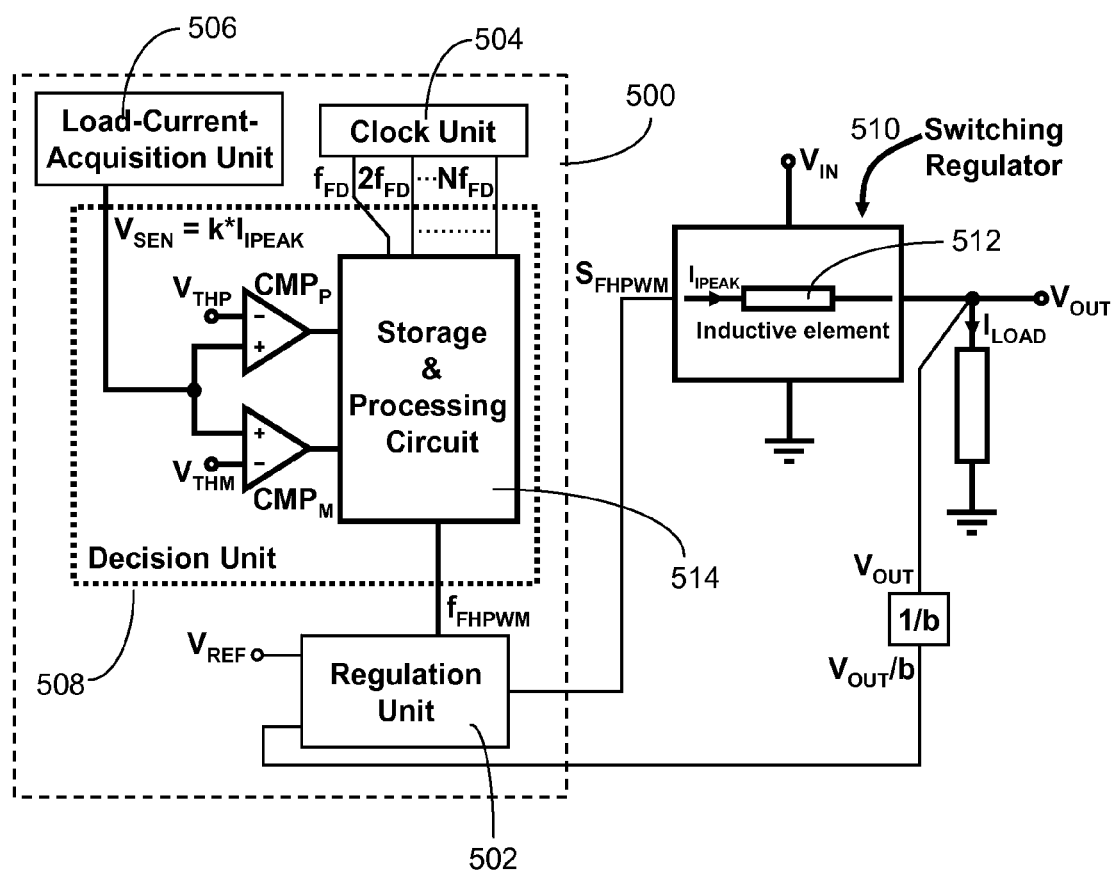
FIG. 5 is a schematic of a modulator in accordance with an embodiment of the present invention.

Referring to FIG. 5, a schematic of an improved modulator in accordance with one embodiment of the present invention is shown. The modulator 500 includes a regulation unit 502, a clock unit 504, a load-current-acquisition unit 506, and a decision unit 508. Embodiments of the regulation unit 502 generate either a single $S_{FHPWM}$ or multiple $S_{FHPWM}$ with appropriate dead time to control a switching regulator 510 such that an unregulated input voltage ($V_{IN}$) of the switching regulator 510 is regulated to a regulated $V_{OUT}$ that is very close to a scaled version of the reference voltage ($V_{REF}$) applied at the regulation unit 502. Preferably, $V_{OUT}$ is equal to $b*V_{REF}$ where b is a scaling factor, and is nearly independent of the value of $I_{LOAD}$ delivered by the switching regulator 510. The clock unit 504 generates an N number of pre-defined frequencies that, within a tolerance (e.g., within 5%), are all integer multiples of a frequency $f_{FD}$. The load-current-acquisition unit 506 acquires the load current ($I_{LOAD}$) of the switching regulator 510 by sensing the peak current ($I_{IPEAK}$) flowing through the inductive element 512 of the switching regulator 510. In embodiments, the output of the load-current-acquisition unit 506 is either a current or a voltage to represent the sensed $I_{IPEAK}$ either in original scale (e.g., $I_{IPEAK}$) or in a predetermined scale (e.g., $k*I_{IPEAK}$, where k is a scaling factor).

For purposes of illustration, the output of the load-current-acquisition unit 506 is a voltage ($V_{SEN}$) that is equal to $k*I_{IPEAK}$ (e.g., $V_{SEN}=k*I_{IPEAK}$). The decision unit 508 determines and selects the frequency of $S_{FHPWM}$ from the N number of pre-defined frequencies. The decision unit 508 compares the output of load-current-acquisition unit 506, $V_{SEN}$, with two thresholds, which can be either current or voltage thresholds, using two comparators ($CMP_P$ and $CMP_M$). In one embodiment, the two thresholds are voltage thresholds (e.g., $V_{THP}$ and $V_{THM}$). Outputs of $CMP_P$ and $CMP_M$ are stored and processed by the storage and processing circuit 514, which determines which of N numbers of pre-defined frequencies is to be selected as the frequency of $S_{FHPWM}$. When the value of $V_{SEN}$ is between $V_{THP}$ and $V_{THM}$, the decision unit 508 maintains the frequency of $S_{FHPWM}$ at the same value as before. Once the value of $V_{SEN}$ is larger than $V_{THP}$ and $V_{THM}$, the decision unit 508 increases the frequency of $S_{FHPWM}$ from $f_{FHPWM}(i)$ to $f_{FHPWM}(i+1)$ (i.e., hops to a next higher frequency), where all the possible values of i are integers inclusively from 1 to N−1. When the frequency of $S_{FHPWM}$ is already at $f_{FHPWM}(N)$, the decision unit 508 maintains the frequency of $S_{FHPWM}$ at $f_{FHPWM}(N)$ even if the value of $V_{SEN}$ is larger than $V_{THP}$ and $V_{THM}$. When the value of $V_{SEN}$ is smaller than $V_{THP}$ and $V_{THM}$, the decision unit 508 decreases the frequency of $S_{FHPWM}$ from $f_{FHPWM}(i)$ to $f_{FHPWM}(i-1)$ (i.e., hops to a next lower frequency), where all the possible values of i are integers inclusively from 2 to N. When the frequency of $S_{FHPWM}$ is already at $f_{FHPWM}(1)$, the decision unit 508 maintains the frequency of $S_{FHPWM}$ to be $f_{FHPWM}(1)$ even if the value of $V_{SEN}$ is smaller than $V_{THP}$ and $V_{THM}$.

Figure 6:
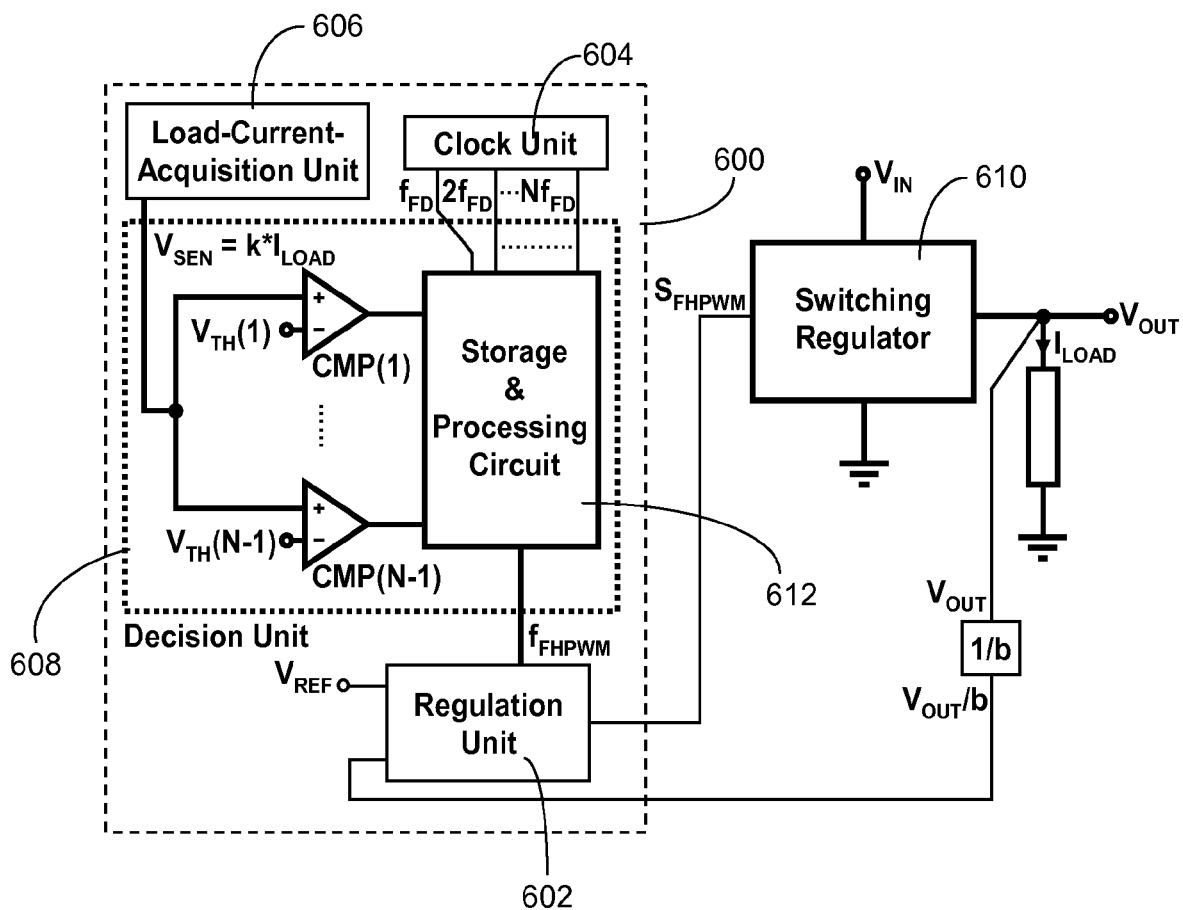
FIG. 6 is a schematic of a modulator in accordance with an alternative embodiment of the present invention.

Referring to FIG. 6, a schematic of another embodiment of the improved modulator is shown. The modulator 600 comprises a regulation unit 602, a clock unit 604, a load-current-acquisition unit 606, and a decision unit 608. In embodiments, the regulation unit 602 generates either a single $S_{FHPWM}$ or multiple $S_{FHPWM}$ with appropriate dead time to control a switching regulator 610 such that an unregulated input voltage $V_{IN}$ is regulated to a regulated voltage $V_{OUT}$ that is very close to a scaled version of $V_{REF}$ applied at the regulation unit 602. Preferably, $V_{OUT}$ is equal to $b*V_{REF}$, where b is a scaling factor, and is nearly independent of the value of $I_{LOAD}$ delivered by the switching regulator 610. The clock unit 604 generates an N number of pre-defined frequencies that, within a tolerance (e.g., within 5%), are all integer multiples of a frequency $f_{FD}$. The load-current-acquisition unit 606 acquires the $I_{LOAD}$ of a switching regulator 610 by sensing current used by a load connected to the switching regulator 610. An output of the load-current-acquisition unit 606 can be either a current or a voltage to represent the sensed $I_{LOAD}$. In embodiments, the sensed $I_{LOAD}$ is represented either in original scale (e.g., $I_{LOAD}$) or in a predetermined scale (e.g., $k*I_{LOAD}$, where k is a scaling factor). For illustration, the output of the load-current-acquisition unit 606 is assumed to be a voltage ($V_{SEN}$) that is equal to $k*I_{LOAD}$ (e.g., $V_{SEN}=k*I_{LOAD}$). The decision unit 608 determines and selects the frequency of $S_{FHPWM}$ from the N number of pre-defined frequencies. In this embodiment, the decision unit 608 compares the output of the load-current-acquisition unit 606, $V_{SEN}$, with N−1 number of thresholds, which can be either current or voltage thresholds, using N−1 number of comparators (e.g., CMP(i), where i is any integer number inclusively between 1 to N−1, and N is a positive integer larger than one). To simplify the following description, the N−1 number of thresholds is assumed to be N−1 number of voltage thresholds (e.g., $V_{TH}(i)$, where i is any integer number inclusively between 1 to N−1, and N is a positive integer larger than one). Outputs of the N−1 number of comparators are stored and processed by the storage and processing circuit 612, which determines which of N numbers of pre-defined frequencies is to be selected as the frequency of $S_{FHPWM}$ according to the value of $I_{LOAD}$. Different ranges of $I_{LOAD}$ (e.g., $\Delta_{IL}(i)$, where i is any integer number inclusively between 1 to N, and N is a positive integer larger than one) are defined by the combination of $V_{TH}(i)$ and maximum and minimum $I_{LOAD}$ a switching regulator 610 can deliver. For example, the values between $V_{TH}(i)$ and $V_{TH}(i+1)$ are represented by $\Delta_{IL}(i+1)$, where i is any integer number inclusively between 1 to N−2, and N is a positive integer larger than three. The $\Delta_{IL}(1)$ represents values between the minimum $I_{LOAD}$ delivered by a switching regulator 610 and $V_{TH}(1)$. The $\Delta_{IL}(N)$ represents values between $V_{TH}(N-1)$ and the maximum $I_{LOAD}$ delivered by a switching regulator 610. As $f_{FHPWM}(i)$ is correspondingly mapped to $\Delta_{IL}(i)$, the decision unit 608 maintains frequency of $S_{FHPWM}$ to be the same value as before (e.g., $f_{FHPWM}(i)$) when the value of $V_{SEN}$ is maintained at the range of $\Delta_{IL}(i)$. When the value of $V_{SEN}$ increases and crosses $V_{TH}(i)$, it means the $I_{LOAD}$ is increased from the range of $\Delta_{IL}(i)$ to the range of $\Delta_{IL}(i+1)$ such that the decision unit 608 increases the frequency of $S_{FHPWM}$ from $f_{FHPWM}(i)$ to $f_{FHPWM}(i+1)$, where all the possible values of i are integers inclusively from 1 to N−1. When the $I_{LOAD}$ is already in the range of $\Delta_{IL}(N)$, the decision unit 608 maintains frequency of $S_{FHPWM}$ to be $f_{FHPWM}(N)$ even if the value of $V_{SEN}$ is further increased. When the value of $V_{SEN}$ decreases and crosses $V_{TH}(i)$, this represents that the $I_{LOAD}$ has decreased from the range of $\Delta_{IL}(i+1)$ to the range of $\Delta_{IL}(i)$ so that the decision unit 608 reduces the frequency of $S_{FHPWM}$ from $f_{FHPWM}(i+1)$ to $f_{FHPWM}(i)$, where all the possible values of i are integers inclusively from 1 to N−1. When the $I_{LOAD}$ is already in the range of $\Delta_{IL}(1)$, the decision unit 608 maintains frequency of $S_{FHPWM}$ to be $f_{FHPWM}(1)$ even if the value of $V_{SEN}$ is further reduced.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for coupling a frequency-hopping pulse-width modulator to a switching regulator, the method comprising:
   acquiring a load current of the switching regulator, wherein the load current is the output current of the switching regulator and the switching regulator is a DC-to-DC switching regulator;
   selecting a frequency according to the load current, wherein the frequency is selected from a plurality of discrete predetermined frequencies based on a mapping of each of the plurality of discrete predetermined frequencies to a corresponding range of load current according to a step function, each of said plurality of discrete predetermined frequencies being approximately an integer multiple of a fundamental frequency of the pulse-width modulator, and wherein the plurality of discrete predetermined frequencies have a directly proportional relationship to the corresponding ranges of load current; and generating a pulse-width-modulated signal for controlling the switching regulator based on the selected frequency.

2. The method of claim 1 further comprising:
holding the selected frequency constant while the load current is within the corresponding range of load current mapped to the selected frequency.

3. The method of claim 1 further comprising:
selecting another frequency corresponding to another corresponding range of load current when the load current changes to a load current within the another corresponding range of load current.

4. The method of claim 1, wherein each corresponding range of load current is defined by two endpoints, wherein each endpoint is selected from the group consisting of a maximum load current, a minimum load current, and a load current falling between the maximum and minimum load currents.

5. A frequency-hopping pulse-width modulator capable of being coupled to a switching regulator, the modulator comprising:
a load current acquisition unit, configured to acquire a load current from the switching regulator, wherein the load current is the output current of the switching regulator and the switching regulator is a DC-to-DC switching regulator;
a decision unit, configured to select a frequency according to the load current acquired by the load current acquisition unit, wherein the frequency is selected from a plurality of discrete predetermined frequencies based on a mapping of each of the plurality of discrete predetermined frequencies to a corresponding range of load current according to a step function, each of said plurality of discrete predetermined frequencies being approximately an integer multiple of a fundamental frequency of the pulse-width modulator, and wherein the plurality of discrete predetermined frequencies have a directly proportional relationship to the corresponding ranges of load current;
a clock unit, configured to generate the plurality of discrete predetermined frequencies; and
a regulation unit, configured to generate at least one pulse-width-modulated signal based on the frequency selected by the decision unit.

6. The frequency-hopping pulse-width modulator of claim 5, wherein each corresponding range of load current is defined by two endpoints, wherein each endpoint is selected from the group consisting of a maximum load current, a minimum load current, and a load current falling between the maximum and minimum load currents.

7. The frequency-hopping pulse-width modulator of claim 5 wherein the decision unit is further configured to hold the selected frequency constant while the load current is within the corresponding range of load current mapped to the selected frequency.

8. The frequency-hopping pulse-width modulator of claim 5 wherein the decision unit is further configured to select another frequency corresponding to another corresponding range of load current when the load current changes to a load current within the another corresponding range of load current.

9. The frequency-hopping pulse-width modulator of claim 5 wherein the load current acquisition unit is configured to acquire a load current from the switching regulator by sensing a peak current flowing through an inductive element of the switching regulator.

10. The frequency-hopping pulse-width modulator of claim 5, wherein the decision unit further comprises:
a first comparator for comparing the load current with a first threshold;
a second comparator for comparing the load current with a second threshold; and
a storage and processing circuit configured to determine which of the plurality of discrete predetermined frequencies is selected based on the outputs of the first comparator and the second comparator.

11. The frequency-hopping pulse-width modulator of claim 5, wherein the decision unit further comprises:
N−1 number of comparators for comparing the load current with N−1 number of thresholds, where N is the number of discrete predetermined frequencies; and
a storage and processing circuit configured to determine which of the plurality of discrete predetermined frequencies is selected based on the outputs of the N−1 number of comparators.

\* \* \* \* \*